(12) United States Patent
Bhandary

(10) Patent No.: US 11,763,160 B2
(45) Date of Patent: Sep. 19, 2023

(54) MACHINE LEARNING METHOD AND SYSTEM FOR SOLVING A PREDICTION PROBLEM

(71) Applicant: AVANSEUS HOLDINGS PTE. LTD., Bugis Junction (SG)

(72) Inventor: Chiranjib Bhandary, Bangalore (IN)

(73) Assignee: AVANSEUS HOLDINGS PTE. LTD., Bugis Junction (SG)

( * ) Notice: Subject to any disclaimer, the term of this patent is extended or adjusted under 35 U.S.C. 154(b) by 880 days.

(21) Appl. No.: 16/787,386

(22) Filed: Feb. 11, 2020

(65) Prior Publication Data
US 2021/0224657 A1 Jul. 22, 2021

(30) Foreign Application Priority Data
Jan. 16, 2020 (IN) .............................. 202011001918

(51) Int. Cl.
*G06N 3/04* (2023.01)
*G06N 3/08* (2023.01)
*G06N 3/084* (2023.01)
*G06N 3/02* (2006.01)
*G06N 3/044* (2023.01)

(52) U.S. Cl.
CPC .............. *G06N 3/084* (2013.01); *G06N 3/02* (2013.01); *G06N 3/044* (2023.01)

(58) Field of Classification Search
CPC ............................. G06N 3/044; G06N 3/084
See application file for complete search history.

(56) References Cited

U.S. PATENT DOCUMENTS

| | | | |
|---|---|---|---|
| 2018/0121793 A1* | 5/2018 | Bhandary | G06N 3/044 |
| 2020/0202212 A1* | 6/2020 | Harada | G06N 3/08 |
| 2021/0157665 A1* | 5/2021 | Rallapalli | G06F 11/3068 |

\* cited by examiner

*Primary Examiner* — Hal Schnee
(74) *Attorney, Agent, or Firm* — Renner, Otto, Boisselle & Sklar, LLP

(57) ABSTRACT

Embodiments of the invention provide machine learning method and system. The method comprises: generating a group of sub-sequences based on a target sequence including n basic memory depth values, the group of sub-sequences includes at least one subset of composite sequences, and each composite sequence in any subset is generated based on an equal number of consecutive basic memory depth values (BMDV); determining weights of each sub-sequence, wherein initial weights for a composite sequence generated based on m BMDV are determined based on average of weights of at least two sub-sequences each having an equal number of BMDV which is less than and closest to m; determining weights of the target sequence based on an average of weights of at least two sub-sequences each having an equal number of BMDV which is closest to n; and solving the prediction problem based on weights of the target sequence.

17 Claims, 15 Drawing Sheets

1 0 0 0 0 1 0 0 0 0 0 0 0 1 0 0 1 0 0 0 0 0 0 0 0 0 0 0 1 0 0
0 0 1 0 0 0 0 0 0 0 1 0 0 1

4-7-2-11-4-7-2

Table 1

Figure 4(a)

Table 2

Figure 4(b)

Table 3

Figure 4(c)

Table 4

Figure 4(d)

Table 5

Figure 5

MACHINE LEARNING METHOD AND SYSTEM FOR SOLVING A PREDICTION PROBLEM

CROSS-REFERENCE TO RELATED APPLICATION

This application claims priority under 35 U.S.C. § 119(a) to Indian Application No. 202011001918, filed 16 Jan. 2020, the entirety of which is hereby incorporated herein by reference.

FIELD OF INVENTION

The invention relates to machine learning mechanism which is suitable for solving a prediction problem, particularly a machine learning method and system for solving a machine failure prediction problem.

BACKGROUND

Accurate prediction of machine failures/faults has significant business benefits since such prediction allows an operation team to take timely preventive action to avoid potential machine failures, or at least make alternative arrangements to eliminate or reduce the negative impact caused by potential machine failures. This is particularly critical for machines involved in providing basic services such as tele-communication, transportation etc., since unavailability of service may cause serious inconvenience and loss of reputation of service providers. Further, accurate machine failure prediction may be helpful to reduce maintenance costs since the cost of the preventive activity is substantially lower than that for fixing machine failures.

A prediction problem can be solved by modelling a sequence generated based on historical data related to the prediction problem. Recurrent neural networks (RNNs) have been widely used to solve prediction problems as RNN can model any sequence involving functional and temporal relationships. However, the major challenges of sequence prediction using standard RNN include the following two problems caused by vanishing and exploding gradient in gradient descent:

1. Convergence is not guaranteed, i.e. uncertainty in convergence;
2. Even if convergence happens, it may take a large number of epochs, i.e. long convergence time.

These problems are prominent when sequence involves long temporal dependency, typically more than 15 time steps. Both of these problems have serious impact. If convergence doesn't happen, prediction is not possible and it is impossible to prevent a machine failure. If convergence takes long time, the prediction result may not be obtained in time and also the cost of prediction may be increased.

Researchers have proposed specialized structure of RNN to overcome these problems. However, even with specialized structure of RNN, convergence time is still too long for real-world prediction problems. Also, there is no guarantee that an arbitrary prediction problem with high or low temporal dependency can be solved within certain time period. For machine failure predictions for a large number of machines, e.g. 500,000, where prediction is required to happen within 3 to 4 hours, this uncertainty in prediction time is not acceptable.

It is therefore desirable to provide a machine learning mechanism which can reduce or even remove the uncertainty in convergence and prediction time effectively.

SUMMARY OF INVENTION

Embodiments of the invention propose a machine learning method and system for solving a prediction problem, e.g. a machine failure prediction problem. In the proposed machine learning method and system, to reduce the uncertainty in convergence and prediction time, a hierarchical way is used to determine weights of a target sequence associated with the prediction problem, instead of running RNN on the target sequence.

According to a first aspect of the invention, a machine learning method for solving a prediction problem is provided. The method comprises:

generating, by a processor in a computer system, a group of sub-sequences based on a target sequence associated with the prediction problem, wherein the target sequence includes n basic memory depth values, n is a positive integer greater than 2, wherein the group of sub-sequences includes at least one subset of composite sequences, and each composite sequence in any subset of composite sequences is generated based on an equal number of consecutive basic memory depth values in the target sequence;

determining, by the processor, weights of each generated sub-sequence, wherein initial weights for determining weights of a composite sequence generated based on m consecutive basic memory depth values are determined based on an average of weights of at least two sub-sequences each having an equal number of basic memory depth values which is less than and closest to m, wherein m is a positive integer less than n, and wherein each of the at least two sub-sequences is same as a part of the composite sequence;

determining, by the processor, weights of the target sequence based on an average of weights of at least two sub-sequences each having an equal number of basic memory depth values which is closest to n; and solving, by the processor, the prediction problem based on the weights determined for the target sequence.

According to a second aspect of the invention, a machine learning system for solving a prediction problem is provided. The system comprises: a computer system having a processor and a memory communicably coupled thereto, wherein the memory is configured to store data to be executed by the processor, wherein the processor is configured to generate a group of sub-sequences based on a target sequence associated with the prediction problem, wherein the target sequence includes n basic memory depth values, n is a positive integer greater than 2, wherein the group of sub-sequences includes at least one subset of composite sequences, and each composite sequence in any subset of composite sequences is generated based on an equal number of consecutive basic memory depth values in the target sequence;

determine weights of each generated sub-sequence, wherein initial weights for determining weights of a composite sequence generated based on m consecutive basic memory depth values are determined based on an average of weights of at least two sub-sequences each having an equal number of basic memory depth values which is less than and closest to m, wherein m is a positive integer less than n, and wherein each of the at least two sub-sequences is same as a part of the composite sequence;

determine weights of the target sequence based on an average of weights of at least two sub-sequences each having an equal number of basic memory depth values which is closest to n; and solve the prediction problem based on the weights determined for the target sequence.

According to a third aspect of the invention, a non-transitory computer readable medium is provided. The computer readable medium comprises computer program code for solving a prediction problem, wherein the computer program code, when executed, is configured to cause a processor in a computer system to perform a machine learning method for solving a prediction problem according to embodiments of the invention.

BRIEF DESCRIPTION OF THE DRAWINGS

The invention will be described in detail with reference to the accompanying drawings, in which:

FIG. 4(a) and FIG. 4(b) are Table 1 and Table 2 showing weights determined for the sub-sequence 4-7-2-11-4 and sub-sequence 7-2-11-4-7 respectively according to one embodiment of the invention;

FIG. 4(c) is Table 3 showing the average of weights of the sub-sequence 4-7-2-11-4 and sub-sequence 7-2-11-4-7;

FIG. 4(d) is Table 4 showing final weights determined for sub-sequence 4-7-1-11-4-7 by running RNN up to 500 epochs using the estimated weights as initial weights;

FIG. 5 is Table 5 showing state vectors generated for the target sequence 4-7-2-11-4-7-2;

DETAILED DESCRIPTION OF EMBODIMENTS OF THE INVENTION

Figure 1A:
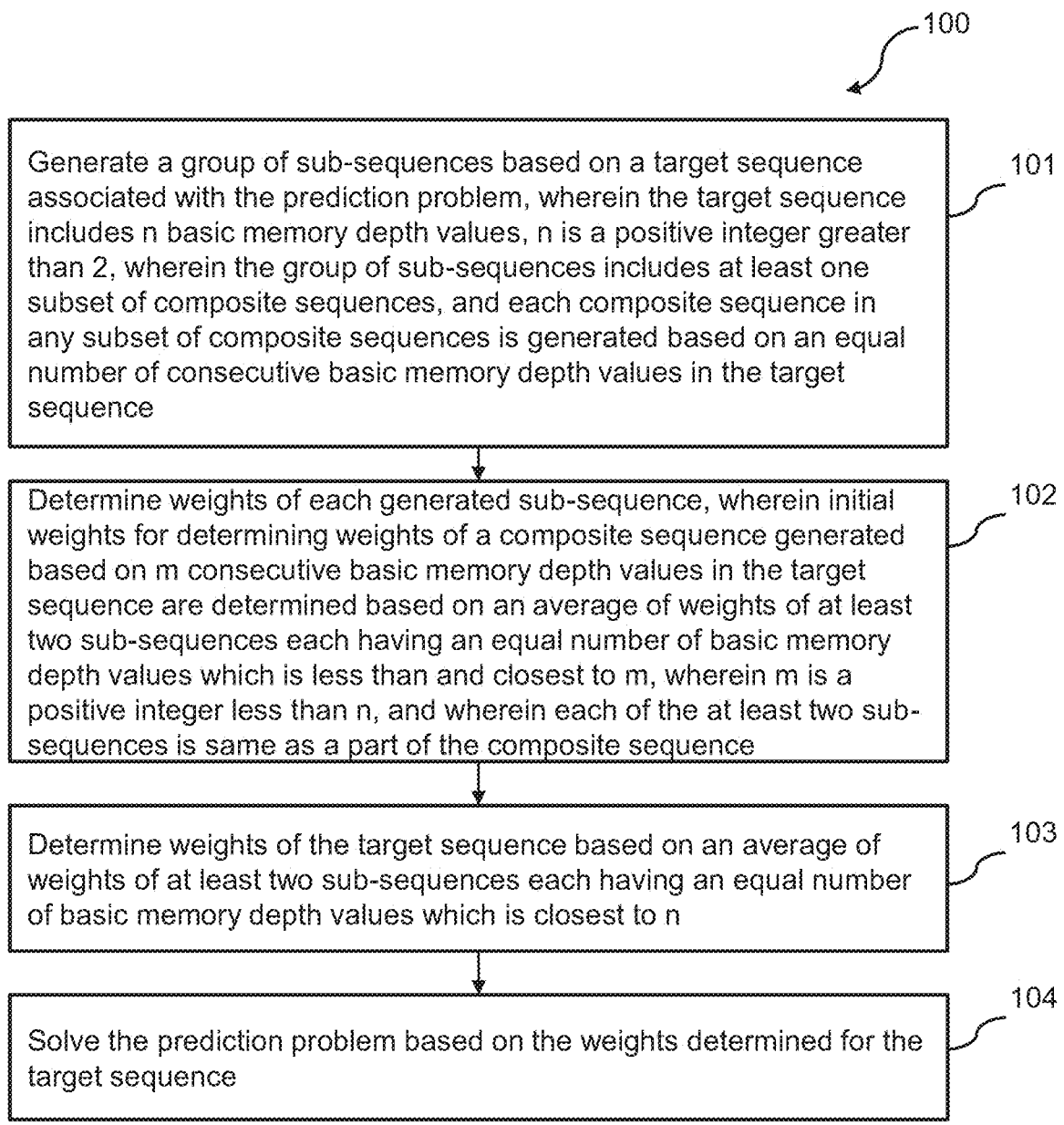
FIG. 1(a) is a flow chart illustrating a machine learning method for solving a prediction problem according to some embodiments of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of one of the methods or systems are analogously valid for the other methods or systems. Similarly, embodiments described in the context of a method are analogously valid for a system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements.

As used herein, the term "configured to" is interchangeable with "operative to" or "adapted to".

When running RNN to solve a prediction problem, uncertainty in convergence and prediction time may be caused by determination of initial weights between input and hidden units. Specifically, if RNN is run based on initial weights which are far away from the final weights, convergence may not happen or may take a very long time. To solve this problem, embodiments of the invention provide a machine learning method including an encoding/self-organization process. In this encoding/self-organization process, to determine weights of a target sequence/input sequence associated with the prediction problem, a group of sub-sequences are generated based on the target sequence so that the weights of the target sequence can be determined based on weights of the generated sub-sequences without the need of running RNN on the target sequence. The RNN is then run based on the determined weights of the target sequence to get convergence on the target sequence.

Encoding/Self-Organization Process

The encoding/self-organization process can be considered as a generalization process. A physical representation of this is to generate a sequence of a set of units/objects with certain values which is in equilibrium. Each sequential state of this sequence evolves from an earlier state based on a functional dependence. In RNN, weights are parameters of the function. The sequence is in equilibrium if the states of the sequence repeat with epsilon-close. Another way to understand equilibrium is that when the sequence can produce itself with some generalization, the equilibrium may be achieved in a second way by using a hierarchical composition of weights of recurrent layer. Both ways mentioned above may be used to yield the same states of a sequence. In some embodiments of the invention, the first way is applied to predict the states of a target sequence.

FIG. 1(a) is a flow chart illustrating a machine learning method 100 for solving a prediction problem according to some embodiments of the invention. Specifically, this flow chart illustrates the encoding/self-organization process according to some embodiments of the invention.

In block 101, a processor in a computer system generates a group of sub-sequences based on a target sequence associated with the prediction problem, wherein the target sequence includes n basic memory depth values, n is a positive integer greater than 2, wherein the group of sub-sequences includes at least one subset of composite sequences, and each composite sequence in any subset of composite sequences is generated based on an equal number of consecutive basic memory depth values in the target sequence.

In other words, each composite sequence is generated based on at least two consecutive basic memory depth values in the target sequence, and each subset of composite sequences includes all composite sequences generated based on the same number of consecutive basic memory depth values in the target sequence.

Figures 1B, 1C:
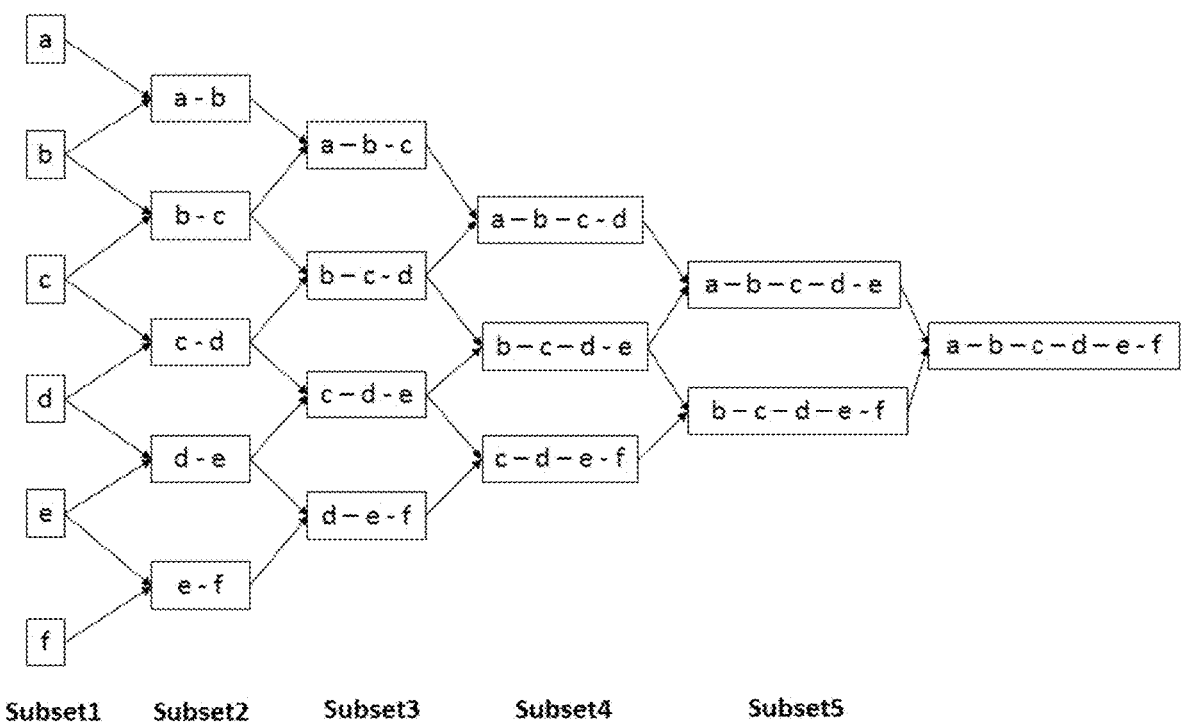
FIG. 1(b) shows an example of a target sequence.
FIG. 1(c) shows one example of a group of sub-sequences generated based on the target sequence in FIG. 1(b)

In embodiments of the invention, a target sequence of 0 and 1 may be expressed as a sequence of basic memory depth values included in the target sequence. A basic memory depth value included in a sequence refers to the number of zeroes between two successive 1s. FIG. 1(b) shows an example of a target sequence. This target sequence includes 6 basic memory depth values which are a, b, c, d, e, and f respectively. Accordingly, the target sequence can be represented as a-b-c-d-e-f.

In some embodiments of the invention, the group of sub-sequences may further include a subset of elementary sequences. The subset of elementary sequences includes all elementary sequences generated based on the basic memory depth values in the target sequence. Each elementary sequence is generated based on a single basic memory depth value in the target sequence.

In embodiments of this invention, an elementary sequence refers to a sequence in which the indicator 1 repeats at a regular interval, i.e. all of the basic memory depth values included in an elementary sequence are same. Further, the sequence length of an elementary sequence is at least the minimum length required for solving a prediction problem. A composite sequence refers to a sequence in which the indicator 1 happens in irregular intervals, i.e. composite sequence includes a plurality of different basic memory depth values.

FIG. 1(c) shows one example of a group of sub-sequences generated based on the target sequence in FIG. 1(b). As shown in FIG. 1(c), the group of sub-sequences includes a subset 1 of elementary sequences, and four subsets 2-5 of composite sequences. In the subset 1, each elementary sequence is generated based on a single basic memory depth value in the target sequence. In the subset 2, each composite sequence is generated based on two consecutive basic memory depth values in the target sequence and the subset 2 includes all of the composite sequences which are generated based on two consecutive basic memory depth values in the target sequence. Similarly, the subsets 3-5 include all of the composite sequences which are generated based on 3-5 consecutive basic memory depth values in the target sequence respectively.

Figure 1D:
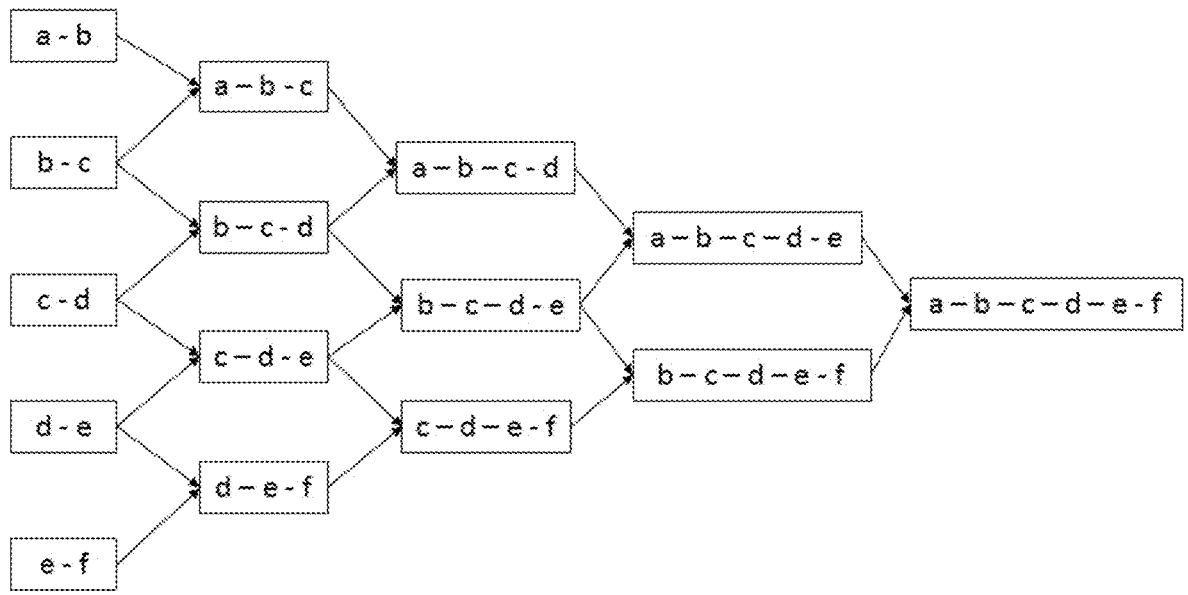
FIG. 1(d) and FIG. 1(e) show two different groups of sub-sequences generated based on the target sequence.
Figure 1E:
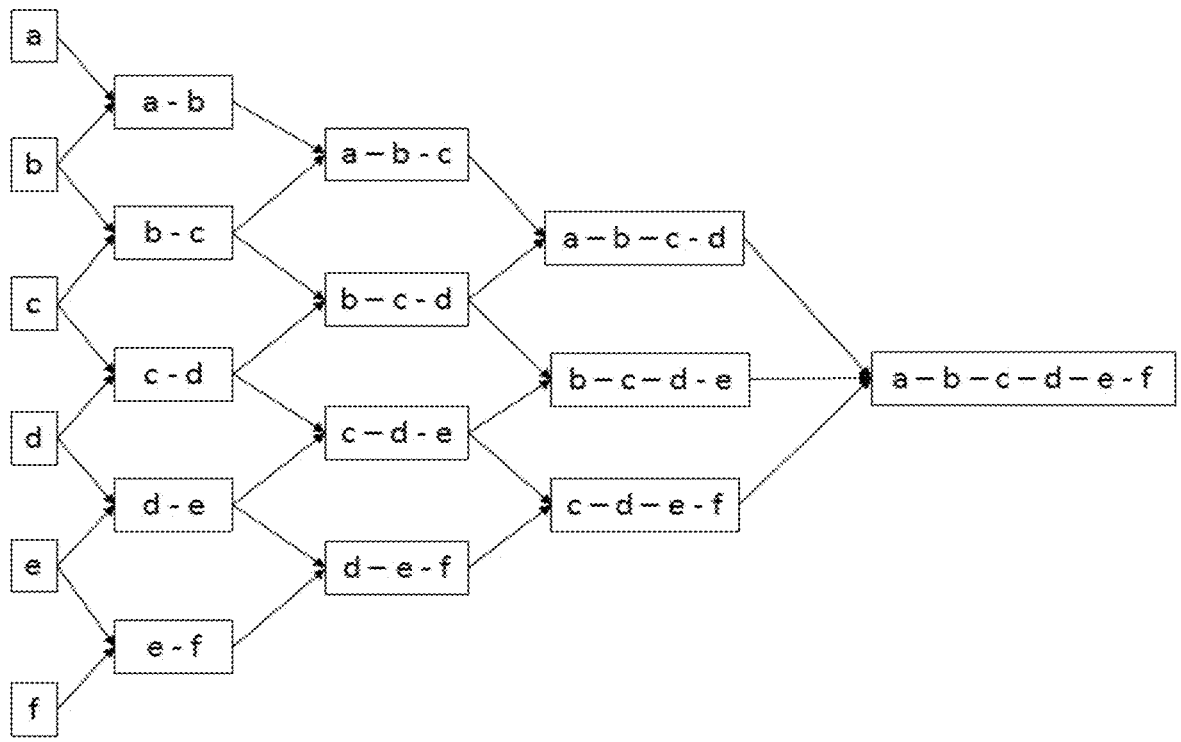

It should be noted that for the same target sequence shown in FIG. 1(b), in some other embodiments of the invention, the group of sub-sequences generated based on the target sequence may be different from the group shown in FIG. 1(c). For example, the group of sub-sequences may not include the subset 1 of elementary sequences, or may not include any one or two of the subsets 2-5 of composite sequences. FIG. 1(d) and FIG. 1(e) show two different groups of sub-sequences generated based on the target sequence. Compared to the group shown in FIG. 1(c), the group in FIG. 1(d) does not include the subset 1 of elementary sequences; and the group in FIG. 1(e) does not include the subset 5 of composite sequences.

In block 102, the processor determines weights of each generated sub-sequence, wherein initial weights for determining weights of a composite sequence generated based on m consecutive basic memory depth values in the target sequence are determined based on an average of weights of at least two sub-sequences each having an equal number of basic memory depth values which is less than and closest to m, wherein m is a positive integer less than n, and wherein each of the at least two sub-sequences is same as a part of the composite sequence.

In one example, the group of the sub-sequences includes n−2 subsets of composite sequences. Accordingly, the initial weights for determining weights of a composite sequence generated based on m basic memory depth values may be determined based on an average of weights of two sub-sequences each having m−1 basic memory depth values.

In some embodiments of the invention, weights of at least one sub-sequence, e.g. all of the sub-sequences, may be determined by running RNN with BPTT until convergence or a predetermined number of iterations is reached, whichever is earlier, based on predetermined initial weights. In one example, the predetermined number of iterations is 500. The initial weights for determining weights of an elementary sequence may be predetermined based on experience.

In some embodiments of the invention, weights of at least one sub-sequence, e.g. all of the elementary sequences and/or all of the composite sequences generated based on two consecutive basic memory depth values in the target sequence, may be retrieved from a pre-stored table which is stored in a memory and includes a plurality of mappings wherein each mapping associates a set of predetermined weights to an elementary sequence or a composite sequence.

In block 103, the processor determines weights of the target sequence based on an average of weights of at least two sub-sequences each having an equal number of basic memory depth values which is closest to n.

In the example where the group of the sub-sequences includes n−2 subsets of composite sequences, weights of the target sequence may be determined based on an average of weights of two sub-sequences each having n−1 basic memory depth values.

For the target sequence shown in FIG. 1(b), if the group of sub-sequences shown in FIG. 1(c) or FIG. 1(d) is generated, the weights of the target sequence may be determined based on average of weights of the two composite sequences a-b-c-d-e and b-c-d-e-f; if the group of sub-sequences shown in FIG. 1(e) is generated, the weights of the target sequence may be determined based on average of weights of the three composite sequences a-b-c-d, b-c-d-e and c-d-e-f.

In block 104, the processor solves the prediction problem based on the weights determined for the target sequence.

In some embodiments of the invention, the processor may be configured to generate the states of the target sequence based on the weights determined for the target sequence and solve the prediction problem by finding the state closest to the current state of the target sequence.

The self-organization process is basically used to achieve equilibrium state for a dynamical system which is non-linear in interaction and has redundancy. Since redundancy helps the self-organization process, a standard number of neurons in recurrent layer are sufficient for solving a prediction problem. Therefore, it is not necessary to focus on selecting a precise number of neurons in recurrent layer. This helps avoid difficulty in deciding state dimension based on problem characteristics.

It should be noted that the self-organization process does not require very large number of neurons, typically, less than 200 are sufficient for all practical learning problems. In some embodiments of the invention, 60 neurons are used if the prediction problem involves a long temporal dependency with a memory depth value up to 100, or 120 if the prediction problem involves a long temporal dependency with a memory depth value up to 3000.

With the proposed self-organization process, initial weights of each composite sub-sequence are determined based on weights of sub-sequences in a lower level subset, i.e. a subset including sub-sequences generated based on less basic memory depth values in the target sequence, and the weights of the target sequence are determined only based on weights of the sub-sequences in a highest level subset, i.e. a subset including sub-sequences generated based on the highest number of basic memory depth values in the target sequence. It has been proved that weights determined in this proposed way are so close to final weights of the target sequence that only one recurrent epoch is needed to get the correct state vectors. This means that iterations for weight update may be completely avoided. Hence, the proposed self-organization process can reduce or even remove the uncertainty in convergence and prediction time effectively.

Efficiency of the recurrent layer is dependent on how quickly the self-organization process is performed. In other words, how quickly the weights of the target sequence can be obtained among neurons which make the states differentiable, i.e. two states which represent different situations should be sufficiently different, and maintain the generalization capability. In some embodiments of the invention, weights of a sub-sequence may be determined by running a predetermined number of epochs/iterations, e.g. 500, on the sub-sequence so that the target sequence could be modelled without ever running RNN on the target sequence. This provides a bound on number of epochs/iterations for modelling of any arbitrary target sequence such that the prediction time can be further reduced.

Take the group of sub-sequences in FIG. 1(c) as an example, if the target sequence includes n (n=7) basic memory depth values, and weights of the sub-sequences in the subset 1 and subset 2 have been pre-calculated and stored in a table, then the number of times for calculation of weights of sequences can be calculated according to the following Equation (1). Subtraction of 1 is due to the fact that for the target sequence, weights are just determined by averaging the weights of the previous two sub-sequences and it is not necessary to refine the weights by running RNN.

$$((n-1)(n-2)/2)-1 \tag{1}$$

Since each calculation of weights is limited to 500 iterations, the maximum number of iterations can be calculated according to Equation (2)

$$(((n-1)(n-2)/2)-1)\times 500 \tag{2}$$

Further, as weights of a sequence determined using the method proposed by embodiments of the invention are very close to final weights of the sequence, the BPTT parameters are not needed to be tuned precisely. In view of this, in embodiments of the invention, it is not necessary to use learning rate schedule or gradient acceleration since use of a fixed learning rate, e.g. 0.2, is sufficient to achieve equilibrium state. In some embodiments of the invention, the following parameters may be used for solving the prediction problem:

Learning rate (fixed): 0.20
Number of old time steps used for gradient update: 30
Activation function: Sigmoid In some embodiments of the invention, the processor may run a standard RNN based on the weights determined for the target sequence to get convergence on the target sequence so as to solve the prediction problem, i.e. obtain a next value in the target sequence.

When running RNN to solve a prediction problem, simultaneous adjustment of weights in recurrent as well as read-out layer may pose a problem since if weights on one layer are adjusted wrongly, even though weights on other layers are close to correct values, correct weights will be changed to wrong values. Making both of the layers moving in correct direction is a delicate act and depends on initial learning rate and learning schedule. To address this problem and further ensure certainty in convergence and reduce time for prediction, in some embodiments of the invention, the read-out layer in RNN may be removed and replaced with a high-dimensional (HD) projection process. The details of the HD projection process will be described below.

Decoding/High-Dimensional (HD) Projection Process

Figure 2A:
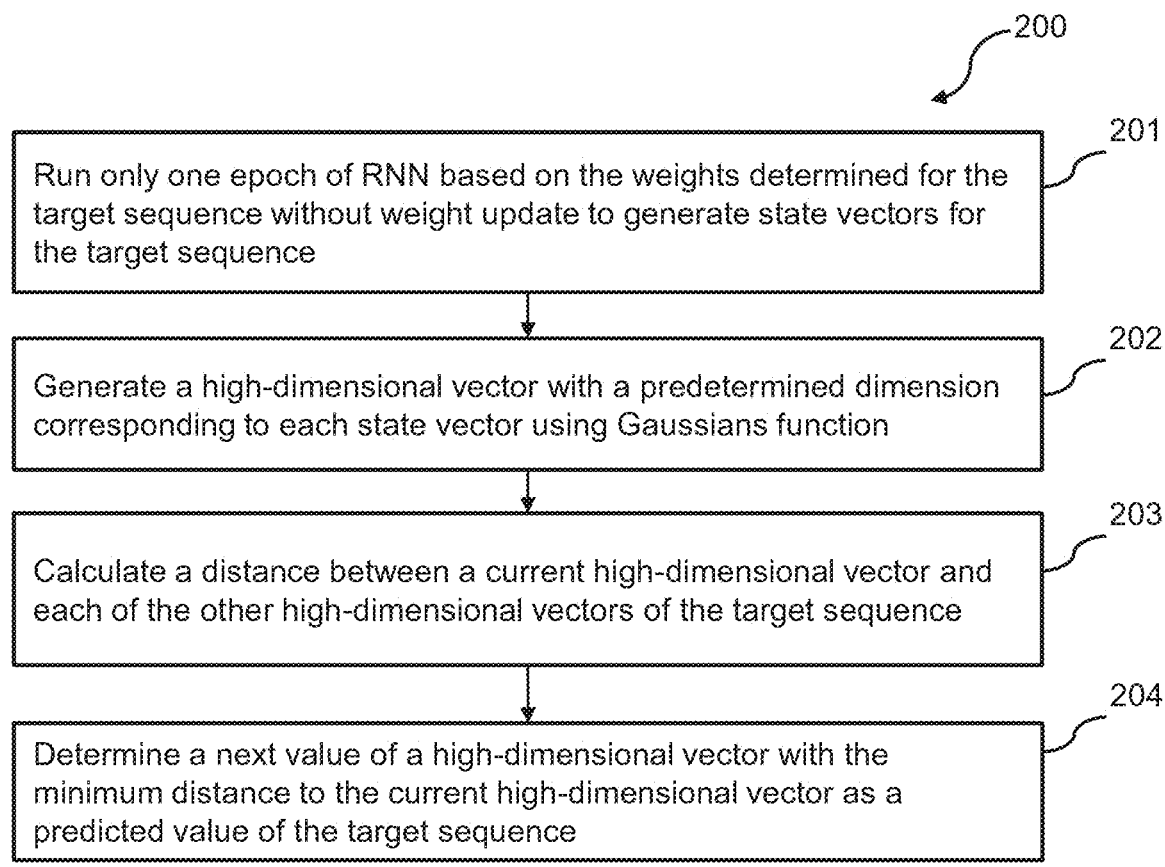
FIG. 2(a) is a flow chart illustrating the high-dimensional projection process according to some embodiments of the invention.

FIG. 2(a) is a flow chart illustrating the high-dimensional projection process 200 according to some embodiments of the invention.

In block 201, the processor runs only one epoch of RNN based on the weights determined for the target sequence without weight update to generate state vectors for the target sequence.

In block 202, the processor generates a high-dimensional vector with a predetermined dimension corresponding to each state vector using Gaussians function.

In one example, the state vectors generated for a target sequence may be represented as follows:

$$S_1 = \{s11, s12, s13 \dots\}$$

$$S_2 = \{s21, s22, s23 \dots\}$$

$S_1$ and $S_2$ represent state vectors and s11, s12, s13, ..., s21, s22, s23, ..., represent state components in the corresponding state vectors. A high-dimensional vector corresponding to each state vector may be generated according to Equation (1):

$$HD_1 = S_1 \times R^T \tag{1}$$
$$HD_2 = S_2 \times R^T$$
$$R = \begin{pmatrix} r_{11} & \cdots & r_{1m} \\ \vdots & \ddots & \vdots \\ r_{n1} & \cdots & r_{nm} \end{pmatrix}, n = 10000$$

Where $HD_1$ refers to the high-dimensional vector corresponds to the state vector $S_1$; $HD_2$ refers to the high-dimensional vector corresponds to the state vector $S_2$; RT stands for transpose of the random matrix R.

While projecting state vectors into a high dimensional space, the projected values may be maintained as 0 or 1 instead of decimal values. Values greater than 0 can be converted to 1 and values less than or equal to 0 can be converted to 0. 0-1 values would be helpful in faster comparison between high-dimensional vectors.

HD projection requires large number of neurons, e.g. greater than 10000, for random projection. In one example, the predetermined dimension is 10000.

In block 203, the processor calculates a distance between a current high-dimensional vector and each of the other high-dimensional vectors of the target sequence.

In block 204, the processor determines a next value of a high-dimensional vector with the minimum distance to the current high-dimensional vector as a predicted value of the target sequence.

Figure 2B:
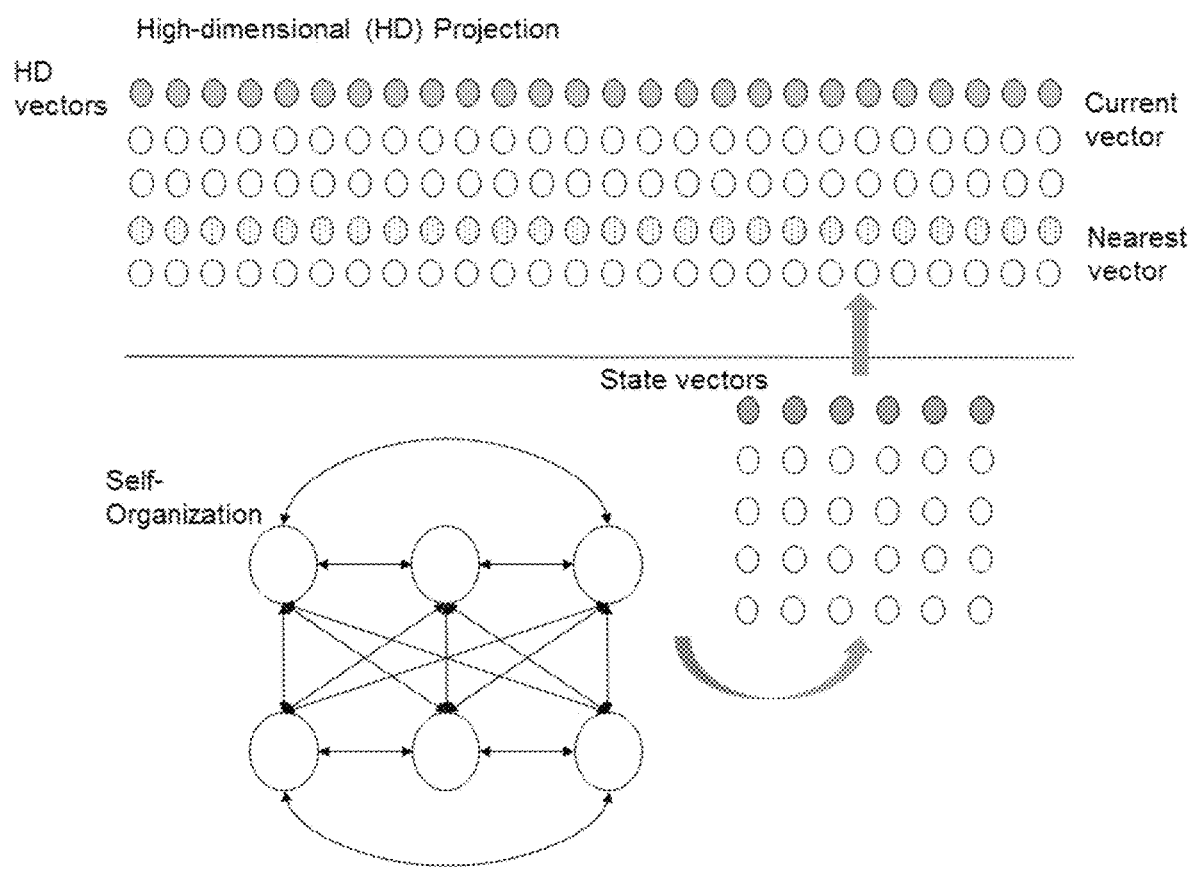
FIG. 2(b) is a schematic diagram showing the machine learning method according to some embodiments of the invention.

FIG. 2(b) is a schematic diagram showing the machine learning method according to some embodiments of the invention. This method includes both the self-organization process and the HD projection process. As shown in FIG. 2(b), the state vectors for the target sequence are generated based on weights of the target sequence determined in the self-organization process, then the state vectors are projected into a high-dimensional space. It should be noted that it is not necessary to combine both of these two processes in other embodiments of the invention. For example, in some embodiments, the self-organization process may be combined with a standard RNN to solve a prediction problem.

Figure 3A:
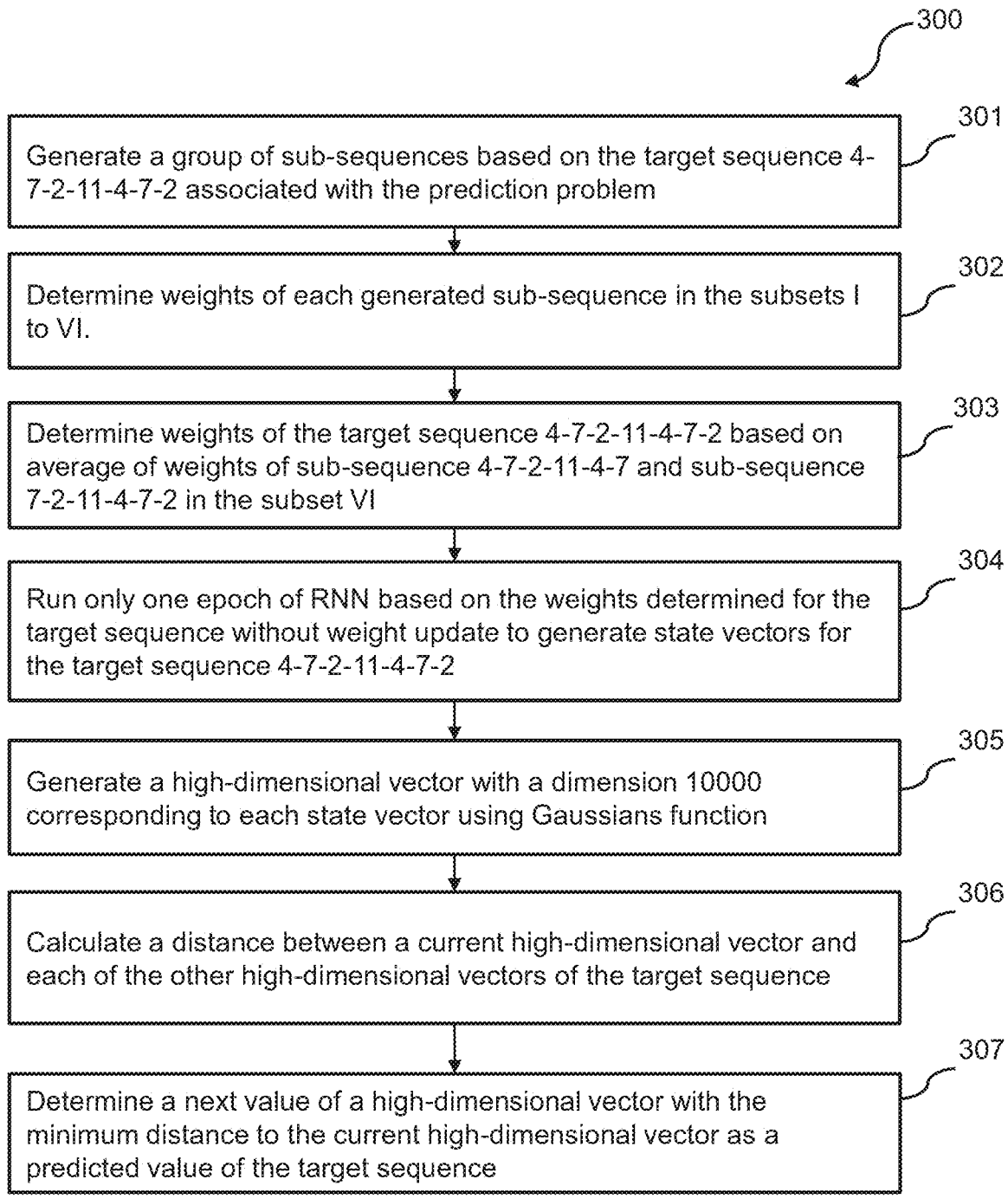
FIG. 3(a) is a flow chart illustrating a machine leaning method for solving a prediction problem according to on embodiment of the invention.

FIG. 3(a) is a flow chart illustrating a machine leaning method 300 for solving a prediction problem according to one embodiment of the invention. In this embodiment, the target sequence associated with the prediction problem, as shown in FIG. 3(b), includes 7 basic memory depth values and can be represented as 4-7-2-11-4-7-2.

In block 301, a processor in a computer system generates a group of sub-sequences based on the target sequence 4-7-2-11-4-7-2.

Figures 3B, 3C:
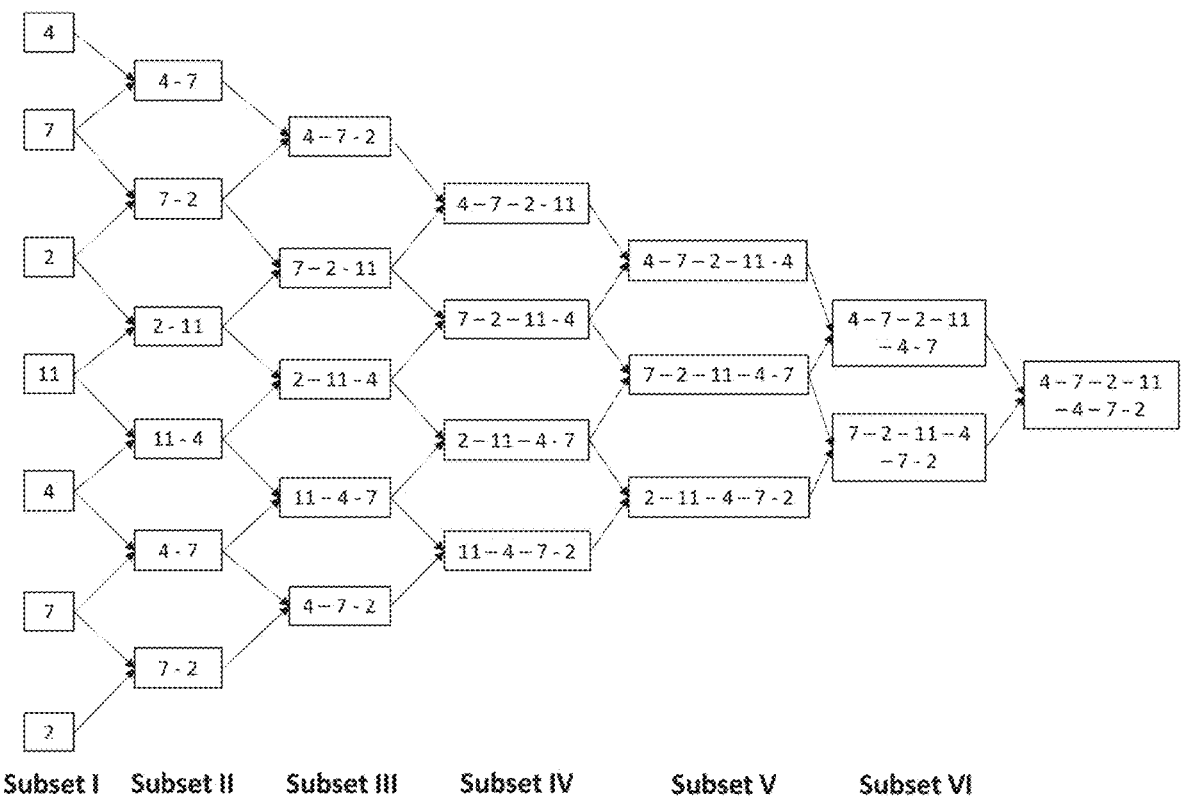
FIG. 3(b) shows the target sequence according to the embodiment in FIG. 3(a)
FIG. 3(c) shows the group of sub-sequences generated based on the target sequence according to the embodiment in FIG. 3(a)

The generated group of sub-sequences is shown in FIG. 3(c). The group of sub-sequences include six subsets, which are subset I to VI. Referring to FIG. 3(c), each subset includes all of the sub-sequences generated based on the same number of basic memory depth values in the target sequence and each sub-sequence in any of the subsets II to VI is generated based on an equal number of consecutive basic memory depth values in the target sequence.

The subset I includes the elementary sequences 4, 7, 2 and 11, which are generated based on a single basic memory depth value in the target sequence respectively.

The subset II includes the composite sequences 4-7, 7-2, 2-11 and 11-4, which are generated based on two consecutive basic memory depth values in the target sequence respectively.

The subset III includes the composite sequences 4-7-2, 7-2-11, 2-11-4, 11-4-7, which are generated based on three consecutive basic memory depth values in the target sequence respectively.

The subset IV includes the composite sequences 4-7-2-11, 7-2-11-4, 2-11-4-7 and 11-4-7-2, which are generated based on four consecutive basic memory depth values in the target sequence respectively.

The subset V includes the composite sequences 4-7-2-11-4, 7-2-11-4-7 and 2-11-4-7-2, which are generated based on five consecutive basic memory depth values in the target sequence respectively.

The subset VI includes the composite sequences 4-7-2-11-4-7 and 7-2-11-4-7-2, which are generated based on six consecutive basic memory depth values in the target sequence respectively.

In block 302, the processor determines weights of each sub-sequence in the subsets I to VI.

In this embodiment, weights of each elementary sequence 4, 7, 2 and 11 may be determined by running RNN with BPTT until convergence based on predetermined initial weights between input and hidden units randomly distributed in range [−1.1, 1.1], fixed learning rate 0.20 and vector distance error of 0.01.

Weights of sub-sequence 4-7 are calculated by running RNN until convergence. The initial weights for determining weights of the sub-sequence 4-7 are taken as average of weights of sub-sequence 4 and sub-sequence 7.

Weights of sub-sequence 7-2 are calculated by running RNN until convergence. The initial weights for determining weights of the sub-sequence 7-2 are taken as average of weights of sub-sequence 7 and sub-sequence 2.

Weights of sub-sequence 2-11 are calculated by running RNN until convergence. The initial weights for determining weights of the sub-sequence 2-11 are taken as average of weights of sub-sequence 2 and sub-sequence 11.

Weights of sub-sequence 11-4 are calculated by running RNN until convergence. The initial weights for determining weights of the sub-sequence 11-4 are taken as average of weights of sub-sequence 11 and sub-sequence 4.

Weights of sub-sequence 4-7-2 are calculated by running RNN until 500 iterations is reached or convergence has occurred, whichever is earlier. The initial weights for determining weights of this sub-sequence are taken as average of weights of sub-sequence 4-7 and sub-sequence 7-2.

Weights of sub-sequence 7-2-11 are calculated by running RNN until 500 iterations is reached or convergence has occurred, whichever is earlier. The initial weights for determining weights of this sub-sequence are taken as average of weights of sub-sequence 7-2 and sub-sequence 2-11.

Weights of sub-sequence 2-11-4 are calculated by running RNN until 500 iterations is reached or convergence has occurred, whichever is earlier. The initial weights for determining weights of this sub-sequence are taken as average of weights of sub-sequence 2-11 and sub-sequence 11-4.

Weights of sub-sequence 11-4-7 are calculated by running RNN until 500 iterations is reached or convergence has occurred, whichever is earlier. The initial weights for determining weights of this sub-sequence are taken as average of weights of sub-sequence 11-4 and sub-sequence 4-7.

Weights of sub-sequence 4-7-2-11 are calculated by running RNN until 500 iterations is reached or convergence has occurred, whichever is earlier. The initial weights for determining weights of this sub-sequence are taken as average of weights of sub-sequence 4-7-2 and sub-sequence 7-2-11.

Weights of sub-sequence 7-2-11-4 are calculated by running RNN until 500 iterations is reached or convergence has occurred, whichever is earlier. The initial weights for determining weights of this sub-sequence are taken as average of weights of sub-sequence 7-2-11 and sub-sequence 2-11-4.

Weights of sub-sequence 2-11-4-7 are calculated by running RNN until 500 iterations is reached or convergence has occurred, whichever is earlier. The initial weights for determining weights of this sub-sequence are taken as average of weights of sub-sequence 2-11-4 and sub-sequence 11-4-7.

Weights of sub-sequence 11-4-7-2 are calculated by running RNN until 500 iterations is reached or convergence has occurred, whichever is earlier. The initial weights for determining weights of this sub-sequence are taken as average of weights of sub-sequence 11-4-7 and sub-sequence 4-7-2.

Weights of sub-sequence 4-7-2-11-4 are calculated by running RNN until 500 iterations is reached or convergence has occurred, whichever is earlier. The initial weights for determining weights of this sub-sequence are taken as average of weights of sub-sequence 4-7-2-11 and sub-sequence 7-2-11-4.

Weights of sub-sequence 7-2-11-4-7 are calculated by running RNN until 500 iterations is reached or convergence has occurred, whichever is earlier. The initial weights for determining weights of this sub-sequence are taken as average of weights of sub-sequence 7-2-11-4 and sub-sequence 2-11-4-7.

Weights of sub-sequence 2-11-4-7-2 are calculated by running RNN until 500 iterations is reached or convergence has occurred, whichever is earlier. The initial weights for determining weights of this sub-sequence are taken as average of weights of sub-sequence 2-11-4-7 and sub-sequence 11-4-7-2.

Weights of sub-sequence 4-7-2-11-4-7 are calculated by running RNN until 500 iterations is reached or convergence has occurred, whichever is earlier. The initial weights for determining weights of this sub-sequence are taken as average of weights of sub-sequence 4-7-2-11-4 and sub-sequence 7-2-11-4-7.

Weights of sub-sequence 7-2-11-4-7-2 are calculated by running RNN until 500 iterations is reached or convergence has occurred, whichever is earlier. The initial weights for determining weights of this sub-sequence are taken as average of weights of sub-sequence 7-2-11-4-7 and sub-sequence 2-11-4-7-2.

It should be noted that in other embodiments of the invention, weights of some sequences with 1 or 2 basic memory depth values may be pre-calculated and stored in a table. As such, during the prediction process, the processor may determine weights of the elementary sequences and composite sequences with two basic depth values by retrieving the weights for these sequences from the pre-stored table.

In block 303, the processor determines weights of the target sequence 4-7-2-11-4-7-2 based on average of weights of sub-sequence 4-7-2-11-4-7 and sub-sequence 7-2-11-4-7-2 in the subset VI.

Figure 4A:
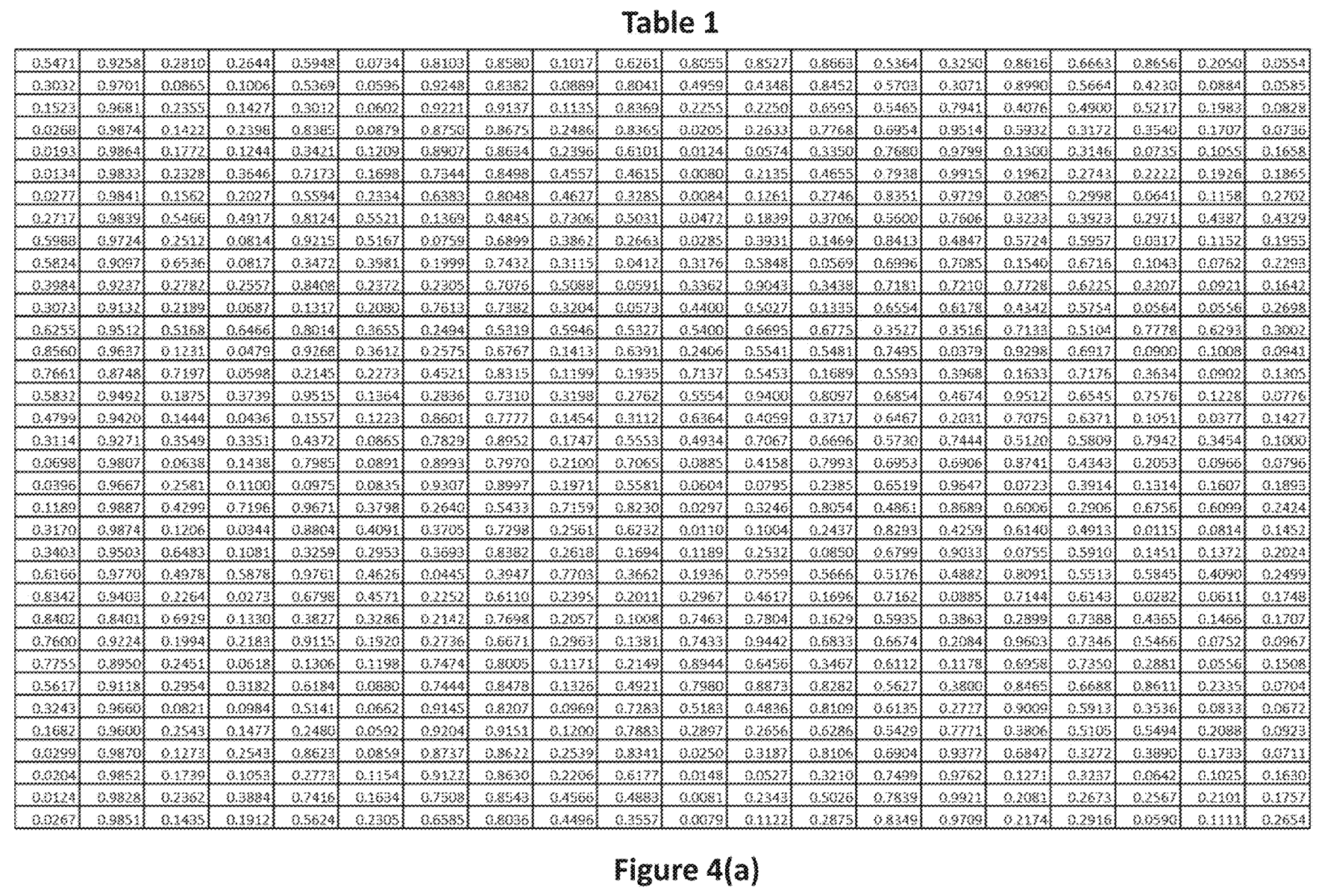
Figure 4B:
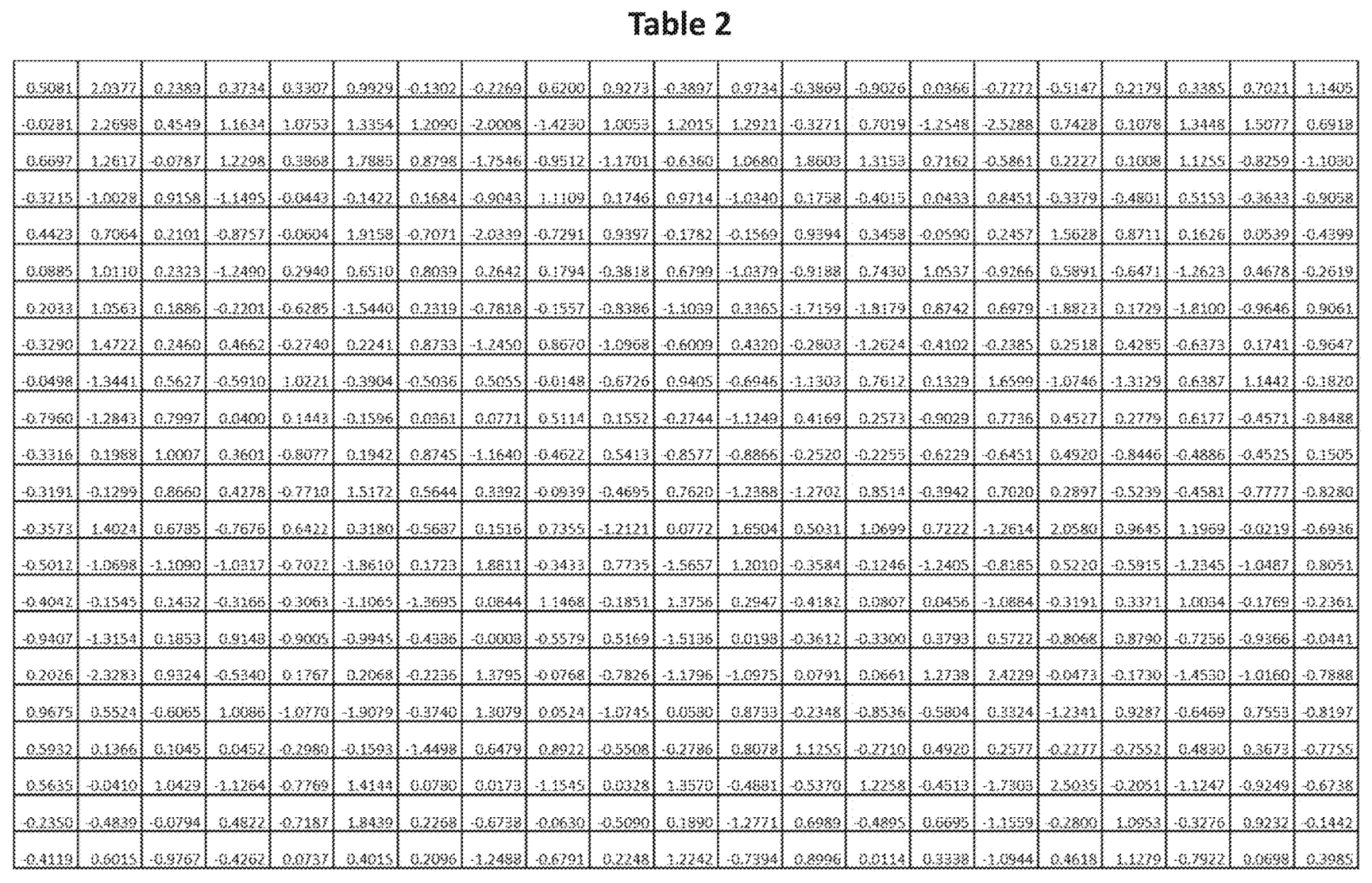
Figure 4C:
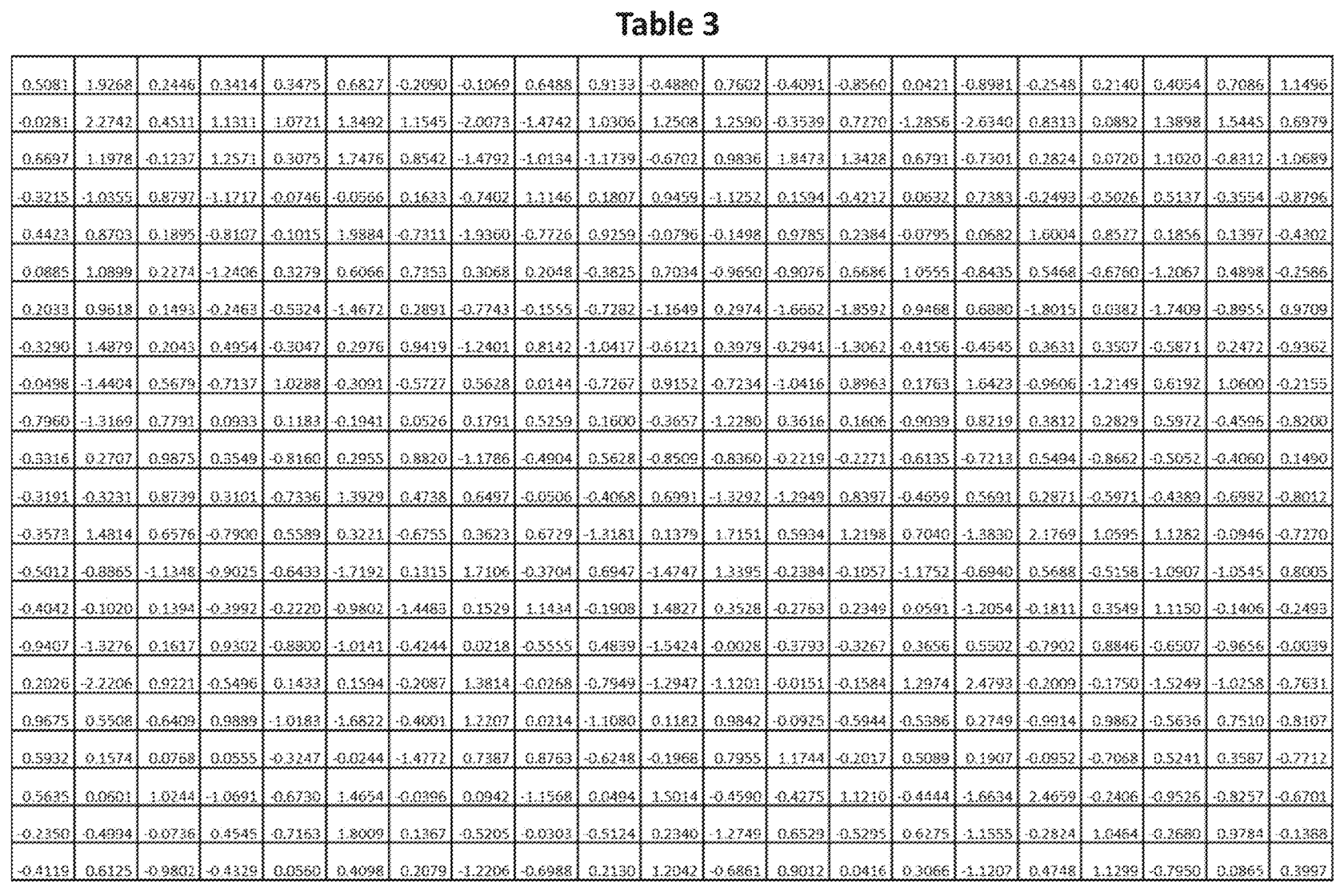
Figure 4D:
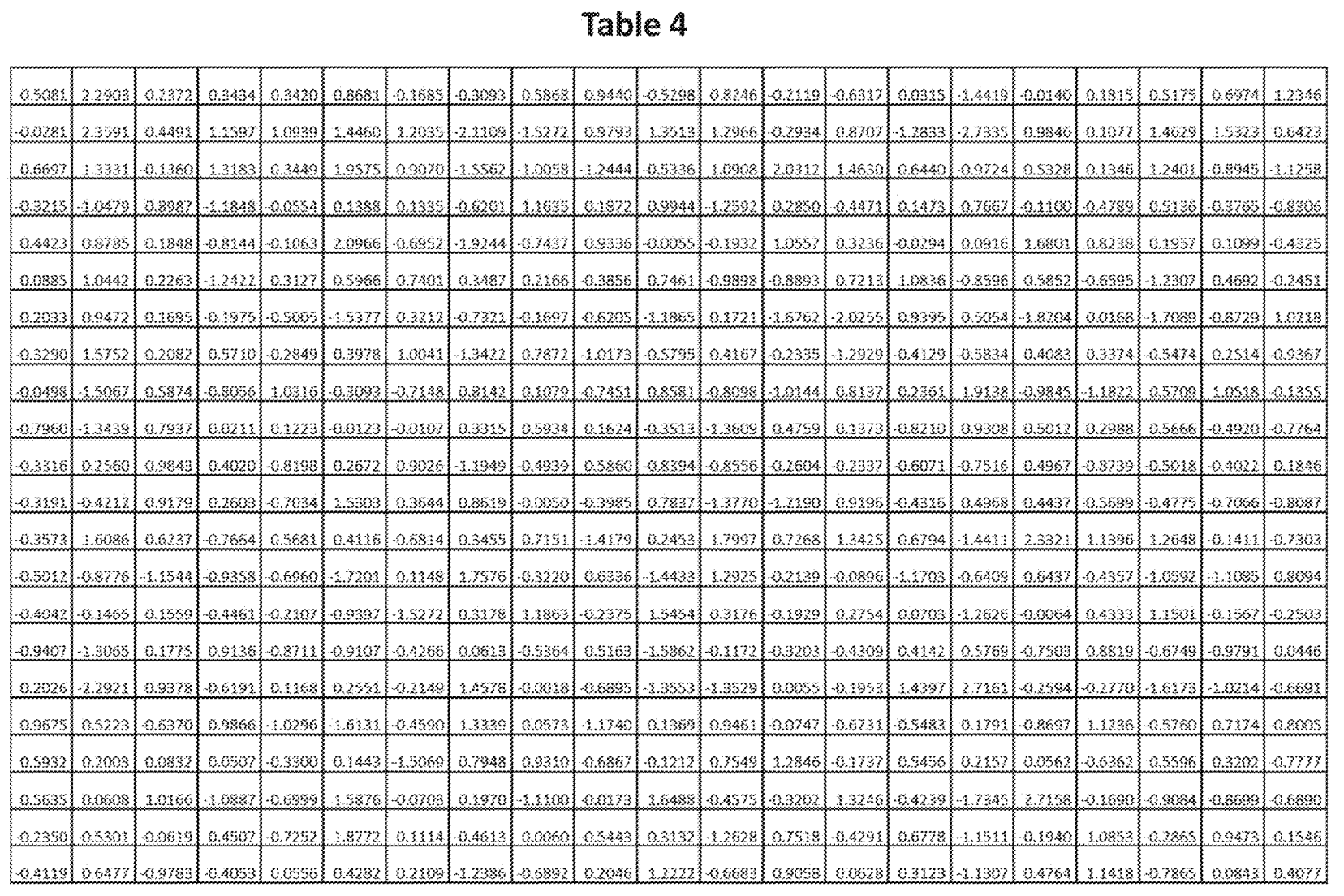
Figure 4E:
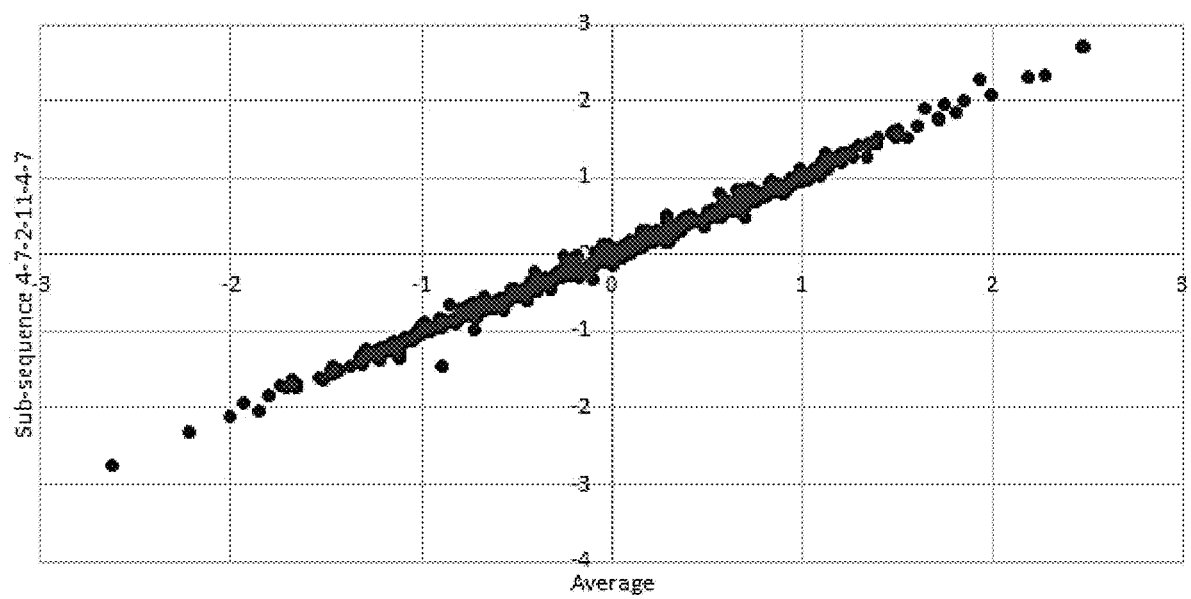
FIG. 4(e) shows the scatter plots of the average of weights in Table 3 and the final weights in Table 4.

FIG. 4(*a*) and FIG. 4 (*b*) are Table 1 and Table 2 showing weights determined for the sub-sequence 4-7-2-11-4 and sub-sequence 7-2-11-4-7 respectively according to one embodiment of the invention. FIG. 4(*c*) is Table 3 showing the average of weights of the sub-sequence 4-7-2-11-4 and sub-sequence 7-2-11-4-7. FIG. 4(*d*) is Table 4 showing final weights determined for sub-sequence 4-7-1-11-4-7. FIG. 4(*e*) shows the scatter plots of the average of weights in Table 3 and the final weights in Table 4. From FIG. 4(*e*), it can be seen that the corresponding weights in Table 3 and Table 4 are very close to each other. This proves the effectiveness and accuracy of the method proposed by embodiments of the invention.

In block 304, the processor runs only one epoch of RNN based on the weights determined for the target sequence 4-7-2-11-4-7-2 without weight update to generate state vectors for the target sequence. Obviously, RNN should be run for just one epoch. Each state vector signifies the encoded representation of the sequence for a specific position.

Figure 5:
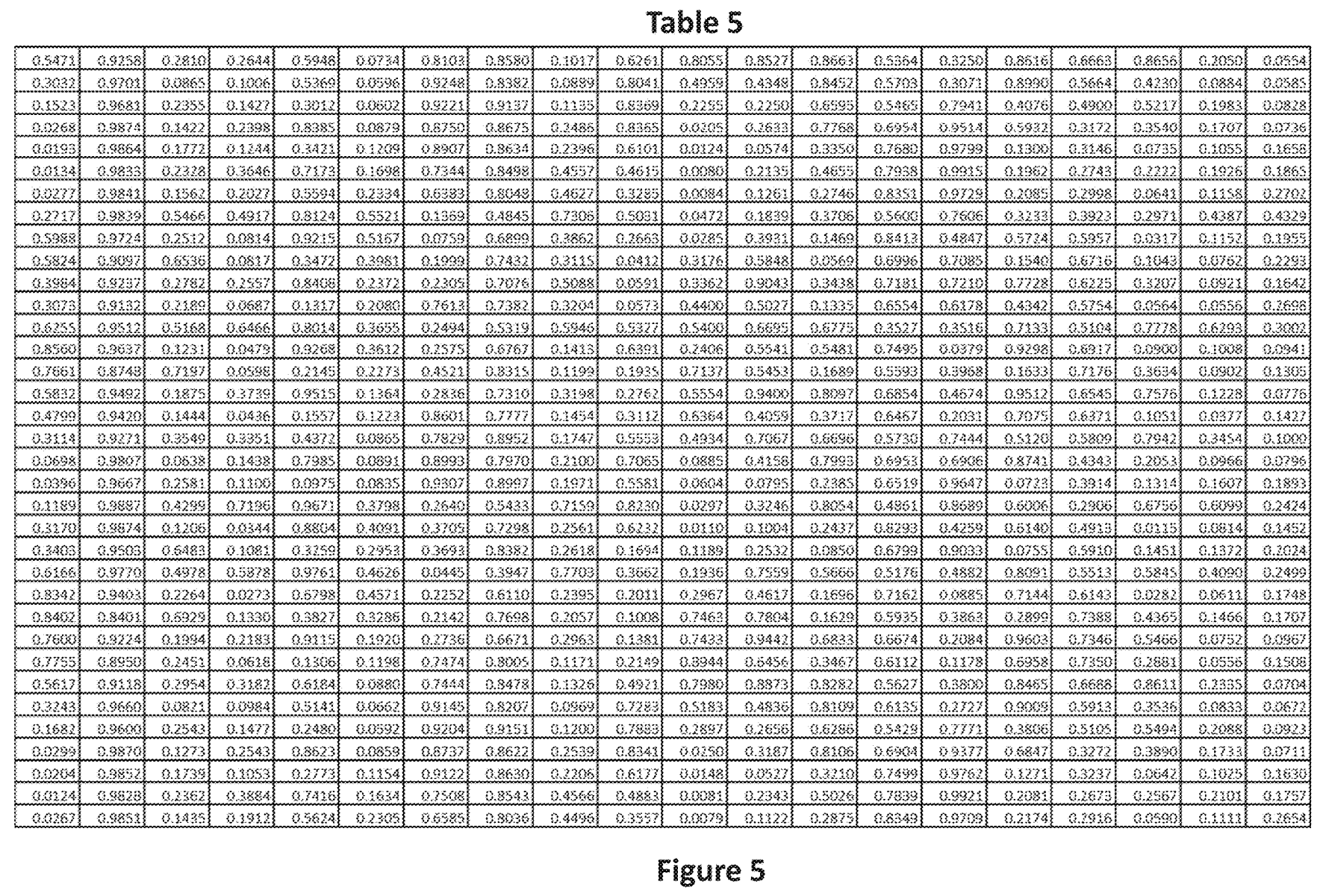

FIG. 5 is Table 5 showing state vectors generated for the target sequence 4-7-2-11-4-7-2. Before generating the state vectors, the target sequence is padded with 11 zeros so that it can be checked whether the next value predicted by the method provided in embodiments of the invention is 1.

In block 305, the processor generates a high-dimensional vector with a dimension of 10000 corresponding to each state vector using Gaussians function.

In block 306, the processor calculates a distance between a current high-dimensional vector and each of the other high-dimensional vectors of the target sequence.

In block 307, the processor determines a next value of a high-dimensional vector with the minimum distance to the current high-dimensional vector as a predicted value of the target sequence.

In this embodiment, the next value comes as 1 as expected.

This embodiment shows that the method for determining weights of a target sequence without actually running RNN on the target sequence is effective and accurate. The target sequence in this embodiment repeats perfectly, however, the method provided in embodiments of the invention can also be used to determine weights of a target sequence which does not repeat perfectly. To prove this, a number of sequences are modelled using the method proposed by embodiments of this invention. The experimental results are shown in the table 6 below:

TABLE 6

| Sl. No. | Target Sequence | Experimental Result | Memory depth |
|---|---|---|---|
| 1 | 1_1_21_1 | 1 after 21 zeroes | 22 |
| 2 | 14-9-17-42-14-9-17 | 1 after 42 zeroes | 82 |
| 3 | 8-13-4-35-8-13-4 | 1 after 35 zeroes | 60 |
| 4 | 10-16-5-39-10-16-5 | 1 after 39 zeroes | 70 |
| 5 | 6-12-25-35-6-12-20 | 1 after 35 zeroes | 78 |
| 6 | 11-3-20-45-11-3-20 | 1 after 45 zeroes | 79 |
| 7 | 7-15-23-40-7-15-25 | 1 after 40 zeroes | 85 |
| 8 | 9-21-28-50-11-9-21-28-50 | 1 after 11 zeroes | 119 |
| 9 | 9-24-30-50-11-9-21-28-50 | 1 after 11 zeroes | 124 |
| 10 | 5-13-22-36-8-27-18-6-5-13-22-36-8-27-18 | 1 after 6 zeroes | 135 |

For sub-sequence modelling, although initial learning rate is not changed based on input sequence and a set of values could be used, in the experiments, a value of 0.2 is used. In the experiments, the following learning schedule is used where error is measured after every epoch as cosine similarity based vector distance between predicted sequence and actual sequence.

| Error | Learning rate |
|---|---|
| Initial | eta = 0.2 |
| <.8 | eta = eta/6 |
| <.6 | eta = eta/2 |
| <.4 | eta = eta/2 |
| <.2 | eta = eta/2 |

In view of the description above, embodiments of the invention provide a way of building the weights of a target sequence from the weights of sub-sequences generated based on the target sequence. And initial weights for determining weights of each sub-sequence are derived from a further lower level subset of sub-sequences. As proved in the experiments, weights derived in this way are very close to final weights of the target sequence. Therefore, the iterations for weight update can be completely avoided and the uncertainty in convergence caused by determination of initial weights can be reduced or even removed effectively. In other words, the machine learning method and system provided by embodiments of this invention may make machine learning almost non-iterative while still maintaining generalization.

Further, some embodiments of the invention also provide a HD projection process to further reduce the uncertainty in convergence and prediction time. The read-out layer is replaced with a high-dimensional projection (>10000 dimensions) and proximity check. High dimensional projection accentuates the difference and also allows composition of multiple sequences into a single high-dimensional vector. Further, as the read-out layer is removed, the overfitting problem in RNN modelling may be completely removed. Actually, each context unit adds to the capacity to differentiate among different states, and more context units just mean more differentiating power or in other words more power to remember/record longer history.

The method and system provided in embodiments of the invention are structurally different from deep learning or RNN or high dimensional computing.

Figure 6:
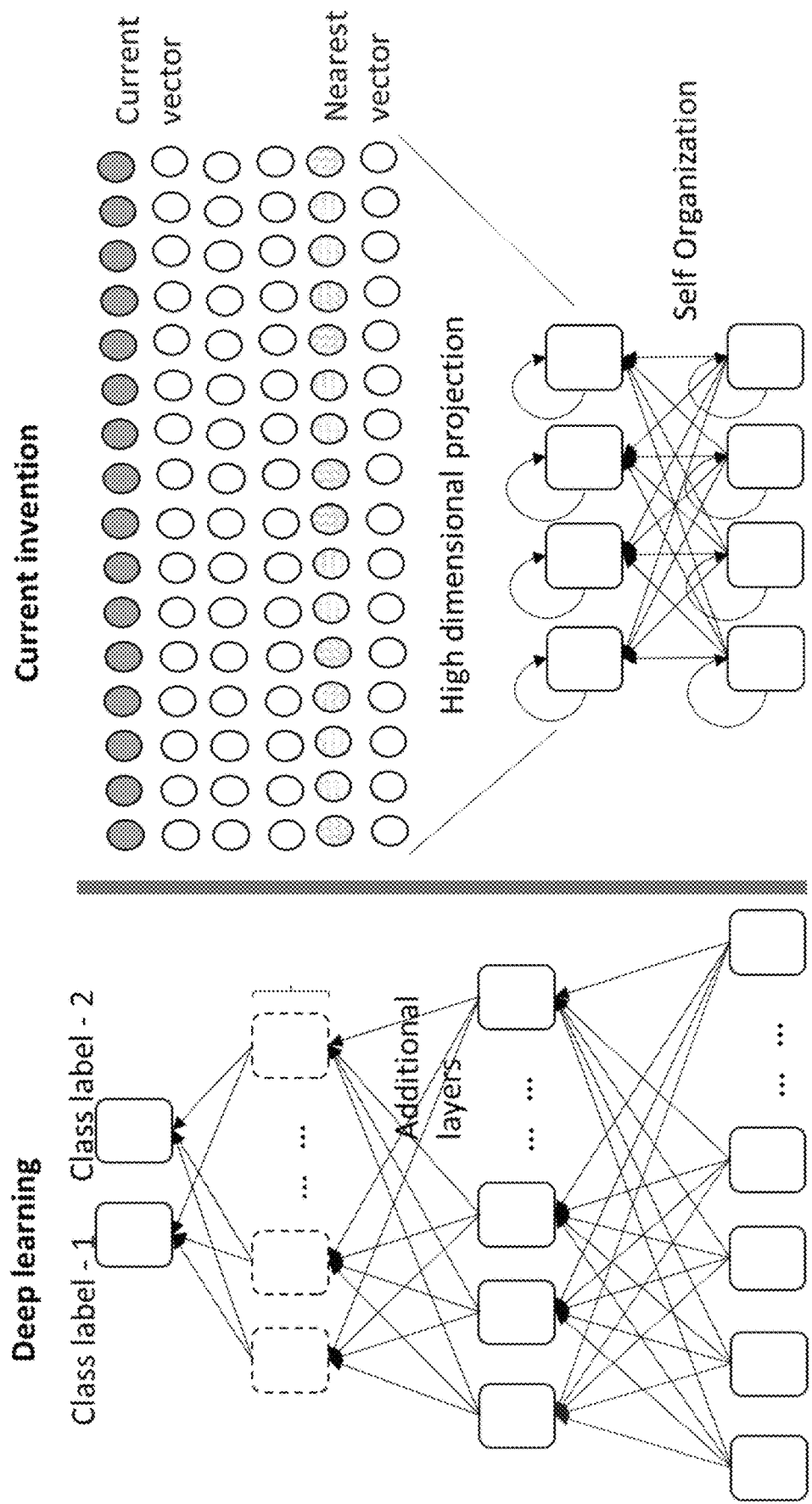
FIG. 6 is a schematic diagram showing the difference between deep learning and the machine learning method according to some embodiments of the invention.

FIG. 6 is a schematic diagram showing the difference between deep learning and the machine learning method according to some embodiments of the invention. Referring to FIG. 6, in deep learning mechanism, the training on a network is performed over multiple layers of neurons. The final layer contains a single neuron for prediction and multiple neurons, as many classes, for classifications. While in the machine learning method and system proposed by some embodiments of the invention, only one recurrent layer and another layer including a plurality of neurons for high-dimensional projection are required. The recurrent layer is configured to perform the encoding/self-organization process and the high-dimensional projection layer is configured to perform the decoding/high-dimensional projection process.

Figure 7:
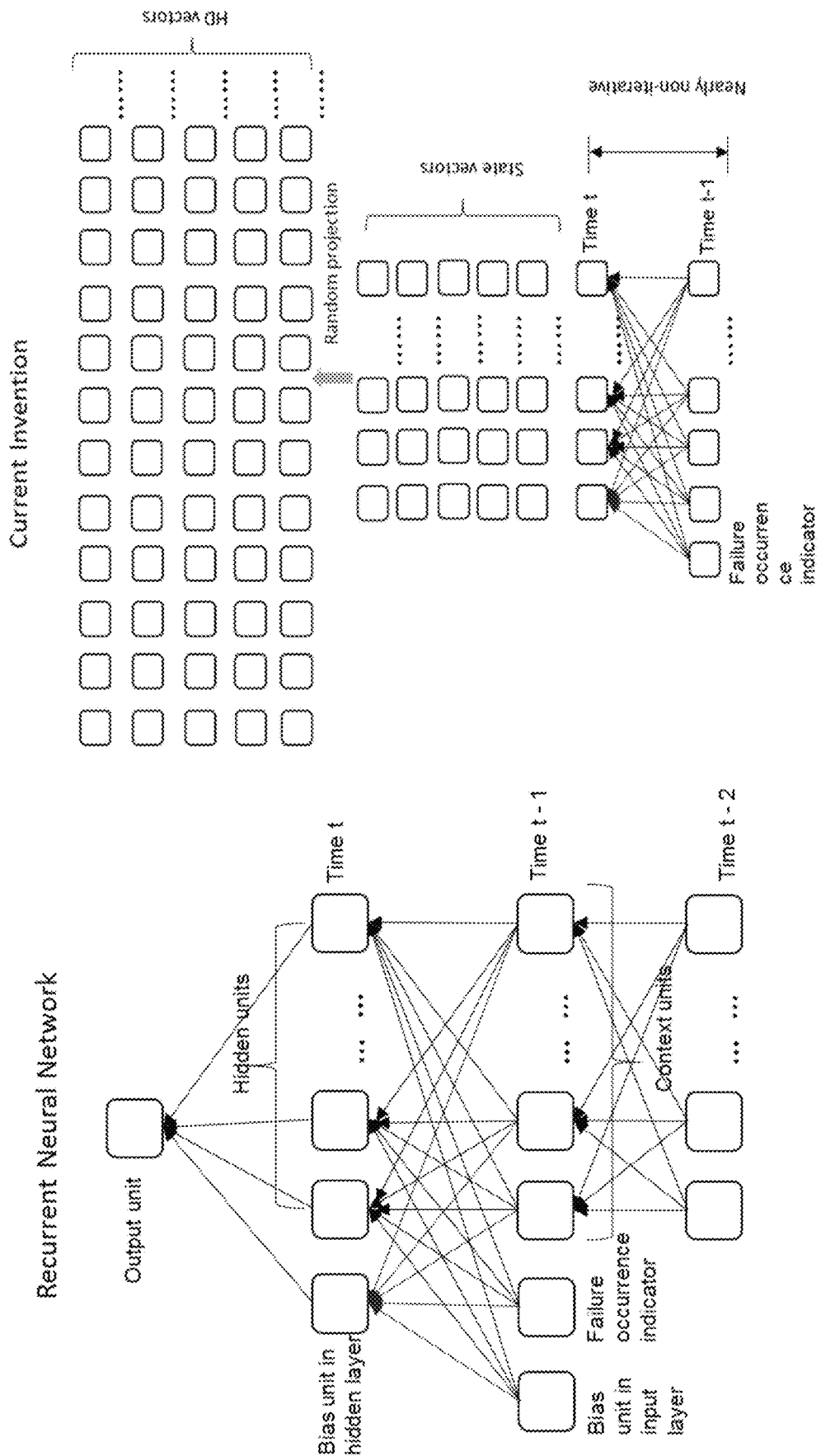
FIG. 7 is a schematic diagram showing the difference between RNN based learning and the machine learning method according to some embodiments of the invention.

FIG. 7 is a schematic diagram showing the difference between RNN based learning and the machine learning method according to some embodiments of the invention. Referring to FIG. 7, in RNN, weights are learnt based on Back-propagation through time (BPTT). Weights of at least two layers are learnt, namely, input to hidden, i.e. recurrent layer, and hidden to output layer, i.e. read-out layer. Main challenge with this architecture is of course to find out the weights quickly so that the network is able to predict and generalize. Other associated challenge is to find a proper error measure to detect convergence early. The problem becomes intractable when there is a time limit for prediction. Hence, for a bounded time prediction, RNN is not suitable. In deeper analysis, problem can be traced to the fact that weights of two layers are to be updated and during state search, through gradient based update, it is too unreliable to not cross past the proper state in a single traversal. Eventually, correct state sequence may be found but after many cycles of weight update. The main issue is unreliability of this weight update based mechanism to settle in limited time.

In contrast, in the machine learning method and system proposed by some embodiments of the invention, the recurrent layer weight update is replaced with a stage-wise weight calculation method with a small number of iterations at each stage, i.e. the self-organization process. Further, the read-out layer is decoupled from recurrent layer and replaced with a very high-dimensional projection and proximity search. Therefore, the method becomes near non-iterative or bounded iterative. Specifically, a near-real time learning is achieved with the method and system proposed by some embodiments of the invention without going through unreliable gradient descent based weight updates and generalization can be maintained while learning.

As will be appreciated from the above, embodiments of the invention provide a machine learning method and system for solving a prediction problem, e.g. a machine failure prediction problem. The advantages of the proposed method and system include but not limited to the following aspects:
1. Reduce or even remove uncertainty of convergence for any arbitrary failure sequence. This vastly improves quality of machine failure prediction.
2. Make maximum convergence time a constant factor of number of sub-sequences. The constant factor may be 500 according to some embodiment of this invention. So, any arbitrary target sequence will have bounded convergence time. This vastly improves reliability of prediction delivery in time.
3. In standard RNN, convergence is very sensitive to parameters like initial learning rate and learning schedule. In the embodiments of the invention, for sub-sequences, these values are kept same for all types of sequences. So, need for parameter tuning may be completely avoided.
4. Avoid vanishing and exploding gradient problems effectively. These problems never arise since weight calculation process ensures that sub-sequence convergence starts with an initial weight set which is very close to the final weight set of the sub-sequence.
5. Provide a pathway to instantaneous learning since it shows that recurrent weights can be estimated without ever running RNN on the target sequence.
6. Do not introduce any complexity in standard RNN structure. Additionally, it simplifies the process of solving the prediction problem by just having one epoch of recurrent calculation of hidden unit values and by replacing read-out layer with a high-dimensional projection layer. Simple Gaussians are used to calculate projections. In essence, there is no need to learn a new specialized structure for learning.
7. Remove over-fitting issue completely since the read-out layer has been replaced with a high-dimensional projection layer.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A machine learning method for solving a prediction problem, the method comprising:
    generating, by a processor in a computer system, a group of sub-sequences based on a target sequence associated with the prediction problem, wherein the target sequence includes n basic memory depth values, n is a positive integer greater than 2, wherein the group of sub-sequences includes at least one subset of composite sequences, and each composite sequence in any subset of composite sequences is generated based on an equal number of consecutive basic memory depth values comprised of zeros and ones located within the target sequence, wherein each zero represents non-failure indicator and each one represents failure indicator;
    determining, by the processor, weights of each generated sub-sequence by running a set of recurrent neural networks (RNNs) with backward propagation through time (BPTT) until convergence or a predetermined number of iterations is reached, whichever is earlier, based on initial weights of constituent sub-sequences which are pre-calculated and stored in a data base table and then used for determining weights of a composite sequence generated based on m consecutive basic memory depth values, wherein the initial weights are pre-calculated based on an average of weights of at least two sub-sequences each having an equal number of basic memory depth values which is less than and closest to m, wherein m is a positive integer less than n, and wherein each of the at least two sub-sequences is same as a part of the composite sequence;
    determining, by the processor, weights of the target sequence based on an average of weights of at least two sub-sequences each having an equal number of basic memory depth values which is closest to n; and solving, by the processor, the prediction problem based on the weights determined for the target sequence, wherein each basic memory depth value refers to a number of zeroes between two successive ones;

wherein the step of solving the prediction problem based on the weights determined for the target sequence comprises:

running only one epoch/iteration of a recurrent neural network (RNN) of the set of RNNs, by the processor, to generate state vectors for the target sequence based on the weights determined for the target sequence without further updating the weights determined for the target sequence;

generating, by the processor, a high-dimensional vector with a predetermined dimension corresponding to each state vector using at least one predetermined Gaussian function;

calculating a plurality of distances between each of the high-dimensional vectors and selecting the smallest distance between any two high-dimension vectors as a minimum distance;

calculating, by the processor, a distance of each high-dimensional vector to a current state vector of the target sequence; and determining, by the processor, a next value of a high-dimensional vector with the minimum distance to the current state vector as a predicted value of the target sequence.

2. The method according to claim 1, wherein the predetermined dimension is 1000.

3. The method according to claim 1, wherein the group of the sub-sequences includes n–2 subsets of composite sequences;

wherein the initial weights for determining weights of the composite sequence generated are pre-calculated based on m basic memory depth values based on an average of weights of two sub-sequences each having m–1 basic memory depth values, wherein the step of determining weights of the target sequence comprises: determining, by the processor, the weights of the target sequence based on an average of weights determined for two sub-sequences each having n–1 basic memory depth values.

4. The method according to claim 1, wherein the group of sub-sequences further includes a subset of elementary sequences, and each elementary sequence in the subset of elementary sequences is generated based on a single basic memory depth value in the target sequence.

5. The method according to claim 1, wherein the predetermined number of iterations is 500.

6. The machine learning method according to claim 1, wherein the step of determining weights of each generated sub-sequence comprises:

retrieving, by the processor, weights of at least one sub-sequence from the pre-stored data base table which includes a plurality of mappings wherein each mapping associates a set of predetermined weights to an elementary sequence or a composite sequence.

7. The method according to claim 1, wherein the step of determining weights of the target sequence comprises:

determining, by the processor, the weights of the target sequence by running only one epoch/iteration of a recurrent neural network (RNN) of the set of RNNs using a predetermined number of neurons.

8. The method according to claim 7, wherein the predetermined number of neurons is 60 if the prediction problem involves a long temporal dependency with a memory depth value up to 100, or 120 if the prediction problem involves a long temporal dependency with a memory depth value up to 3000.

9. The machine learning method of claim 1 employing a non-transitory computer readable medium comprising computer program code for solving a prediction problem, wherein the computer program code, when executed, is configured to cause a processor in a computer system to perform a machine learning method for solving a prediction problem.

10. A machine learning system for solving a prediction problem, the system comprising: a computer system having a processor and a memory communicably coupled thereto, wherein the memory is configured to store data to be executed by the processor, wherein the processor is configured to generate a group of sub-sequences based on a target sequence associated with the prediction problem, wherein the target sequence includes n basic memory depth values, n is a positive integer greater than 2, wherein the group of sub-sequences includes at least one subset of composite sequences, and each composite sequence in any subset of composite sequences is generated based on an equal number of consecutive basic memory depth values comprising of zeros and ones located within the target sequence, wherein each zero represents non-failure indicator and each one represents failure indicator;

determine weights of each generated sub-sequence by running a set of recurrent neural networks (RNNs) with backward propagation through time (BPTT) until convergence or a predetermined number of iterations is reached, whichever is earlier, based on initial weights of constituent sub-sequences which are pre-calculated and stored in a data base table and then used for determining weights of a composite sequence generated based on m consecutive basic memory depth values, wherein the initial weights are pre-calculated based on an average of weights of at least two sub-sequences each having an equal number of basic memory depth values which is less than and closest to m, wherein m is a positive integer less than n, and wherein each of the at least two sub-sequences is same as a part of the composite sequence;

determine weights of the target sequence based on an average of weights of at least two sub-sequences each having an equal number of basic memory depth values which is closest to n; and solve the prediction problem based on the weights determined for the target sequence, wherein each basic memory depth value refers to a number of the zeroes between two successive instances of the ones;

wherein the processor is further configured to solve the prediction problem based on the weights determined for the target sequence by running only one epoch/iteration of a recurrent neural network (RNN) of the set of RNNs to generate state vectors for the target sequence based on the weights determined for the target sequence without further updating the weights determined for the target sequence;

generating a high-dimensional vector with a predetermined dimension corresponding to each state vector using a predetermined Gaussian function;

calculating a distance of each high-dimensional vector to a current state vector of the target sequence; and determining a next value of a high-dimensional vector with the minimum distance to the current state vector as a predicted value of the target sequence.

11. The system according to claim 10, wherein the processor is further configured to generate a high-dimensional vector with a predetermined dimension of 10000 corresponding to each state vector using a pre-determined Gaussian function.

12. The system according to claim 10, wherein the processor is further configured to generate n−2 subsets of composite sequences based on the target sequence;
   determine the weights of the target sequence based on an average of weights determined for two sub-sequences each having n−1 basic memory depth values,
   wherein the initial weights for determining weights of a composite sequence generated based on m basic memory depth values are pre-calculated based on an average of weights of two sub-sequences each having m−1 basic memory depth values.

13. The system according to claim 10, wherein the processor is further configured to generate a subset of elementary sequences, wherein each elementary sequence in the subset of elementary sequences is generated based on a single basic memory depth value in the target sequence.

14. The system according to claim 10, wherein the processor is further configured to run the set of recurrent neural networks (RNNs) with backward propagation through time (BPTT) until convergence or 500 iterations is reached, whichever is earlier, based on the initial weights.

15. The system according to claim 10, wherein the processor is further configured to retrieve weights of at least one sub-sequence from the pre-stored data base table which includes a plurality of mappings wherein each mapping associates a set of predetermined weights to an elementary sequence or a composite sequence.

16. The system according to claim 10, wherein the processor is further configured to determine the weights of the target sequence by running only one epoch/iteration of an RNN of the set of RNNs using a predetermined number of neurons.

17. The system according to claim 16, wherein the processor is further configured to determine the weights of the target sequence by running only one epoch/iteration of an RNN of the set of RNNs using 60 neurons if the prediction problem involves a long temporal dependency with a memory depth value up to 100, or 120 if the prediction problem involves a long temporal dependency with a memory depth value up to 3000.

* * * * *